(12) United States Patent
Huber et al.

(10) Patent No.: US 11,646,621 B2
(45) Date of Patent: May 9, 2023

(54) COOLING DEVICE FOR A STATOR OF AN ELECTRIC MACHINE OF A MOTOR VEHICLE, STATOR, AND MOTOR VEHICLE

(71) Applicant: Bayerische Motoren Werke Aktiengesellschaft, Munich (DE)

(72) Inventors: Andreas Huber, Schoenberg (DE); Jens Richter, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 303 days.

(21) Appl. No.: 16/829,644

(22) Filed: Mar. 25, 2020

(65) Prior Publication Data
US 2020/0227965 A1 Jul. 16, 2020

Related U.S. Application Data

(63) Continuation of application No. PCT/EP2018/073964, filed on Sep. 6, 2018.

(30) Foreign Application Priority Data

Oct. 24, 2017 (DE) ..................... 10 2017 218 933.9

(51) Int. Cl.
*H02K 3/24* (2006.01)
*B60L 3/00* (2019.01)
(Continued)

(52) U.S. Cl.
CPC .............. *H02K 3/24* (2013.01); *B60L 3/0061* (2013.01); *H02K 1/20* (2013.01); *H02K 5/203* (2021.01); *H02K 15/02* (2013.01); *B60L 2240/36* (2013.01)

(58) Field of Classification Search
CPC .. H02K 3/24; H02K 1/20; H02K 5/20; H02K 15/02; H02K 5/203; B60L 3/0061; B60L 2240/36
(Continued)

(56) References Cited

U.S. PATENT DOCUMENTS 3,636,186 A * 1/1972 Sturley ............. B29C 66/53465
29/458
5,725,047 A * 3/1998 Lopez ..................... F28F 9/013
165/149

(Continued)

FOREIGN PATENT DOCUMENTS

| BE | 1015432 A3 | 3/2005 |
|---|---|---|
| DE | 198 13 160 A1 | 11/1998 |
| DE | 10 2015 012 913 A1 | 4/2017 |

OTHER PUBLICATIONS

International Search Report (PCT/ISA/210) issued in PCT Application No. PCT/EP2018/073964 dated Nov. 6, 2018 with English translation (six pages).

(Continued)

*Primary Examiner* — John K Kim
(74) *Attorney, Agent, or Firm* — Crowell & Moring LLP

(57) ABSTRACT

A cooling device for cooling a stator for an electric machine of a motor vehicle having a coolant-conducting unit and at least one winding groove cooling channel is provided. The coolant-conducting unit and the at least one winding groove cooling channel are connectable to a hollow-cylindrical lamination stack of the stator having, in a circumferential direction, a plurality of winding grooves which extend axially and receive windings of the stator. The coolant-conducting unit is arranged on an end face of the lamination stack, conducts coolant along the end face, and has an inlet for supplying the coolant and an outlet for discharging the coolant, and the at least one winding groove cooling channel (Continued)

extending axially from the coolant unit is arranged in at least one winding groove, conducts the coolant in the at least one winding groove, and is fluid-coupled to the inlet and the outlet.

7 Claims, 6 Drawing Sheets

(51) Int. Cl.
    *H02K 1/20* (2006.01)
    *H02K 15/02* (2006.01)
    *H02K 5/20* (2006.01)

(58) Field of Classification Search
    USPC .......................................................... 310/54
    See application file for complete search history.

(56) References Cited

U.S. PATENT DOCUMENTS

| | | | |
|---|---|---|---|
| 5,973,427 A | 10/1999 | Suzuki et al. | |
| 2004/0169427 A1* | 9/2004 | Hoppe | H02K 1/20 310/54 |
| 2006/0108792 A1* | 5/2006 | Takasaki | F16L 39/00 138/155 |
| 2011/0133580 A1* | 6/2011 | Sugimoto | B60L 15/20 310/54 |
| 2015/0091398 A1* | 4/2015 | Bradfield | H02K 3/24 29/596 |
| 2015/0207386 A1* | 7/2015 | Garrard | H02K 15/02 29/596 |
| 2015/0263583 A1* | 9/2015 | Urata | H02K 5/20 310/54 |
| 2015/0280525 A1* | 10/2015 | Rippel | H02K 5/203 310/54 |
| 2015/0280526 A1* | 10/2015 | Chamberlin | H02K 9/22 310/54 |
| 2016/0020658 A1* | 1/2016 | Tamura | H02K 3/28 310/71 |
| 2016/0028284 A1* | 1/2016 | Dajaku | H02K 3/12 310/54 |
| 2018/0337568 A1* | 11/2018 | Dorfner | H02K 5/10 |
| 2019/0299769 A1* | 10/2019 | Li | F16H 57/045 |
| 2020/0227965 A1* | 7/2020 | Huber | H02K 3/24 |

OTHER PUBLICATIONS

German-language Written Opinion (PCT/ISA/237) issued in PCT Application No. PCT/EP2018/073964 dated Nov. 6, 2018 (five pages).

German-language Search Report issued in German Application No. 10 2017 218 933.9 dated Jul. 6, 2018 with partial English translation (12 pages).

\* cited by examiner

COOLING DEVICE FOR A STATOR OF AN ELECTRIC MACHINE OF A MOTOR VEHICLE, STATOR, AND MOTOR VEHICLE

CROSS REFERENCE TO RELATED APPLICATIONS

This application is a continuation of PCT International Application No. PCT/EP2018/073964, filed Sep. 6, 2018, which claims priority under 35 U.S.C. § 119 from German Patent Application No. 10 2017 218 933.9, filed Oct. 24, 2017, the entire disclosures of which are herein expressly incorporated by reference.

BACKGROUND AND SUMMARY OF THE INVENTION

The invention relates to a cooling device for cooling a stator for an electric machine of a motor vehicle. The invention moreover relates to a stator for an electric machine of a motor vehicle, as well as to a motor vehicle.

The present invention is directed toward electric machines for motor vehicles, in particular electric propulsion machines for electric or hybrid vehicles. Said electric machines usually have a stator and a rotor which is mounted so as to be rotatable in relation to the stator. The stator has a laminated sheet package, windings configuring a respective coil head at the axial end of said laminated sheet package. A power loss in the form of heat on account of which the electric machine heats up is created in the operation of the electric machine. This heating of the electric machine can negatively influence the output of the electric machine. Overheating of the electric machine can even lead to the failure of the electric machine.

To this end, it is known from the prior art for the stator of an electric machine in the region of the laminated sheet package to be cooled by way of contact between the laminated sheet package and a housing of the stator. To this end the housing can be equipped with a dedicated cooling device, this however being very complex in terms of production and moreover very expensive. When the cooling device is situated on an internal side of the housing, there is a disadvantage that the housing is very voluminous and takes up too much space. Moreover, it is known for a cooling medium for cooling the housing to be provided on an external side of the housing. Cooling by way of the housing has to overcome the thermal transfer resistance between the laminated sheet package and the housing, the thermal transfer resistance reducing the potential cooling effect, and requires a positive mechanical connection between the laminated sheet package and the housing, for example by way of an interference fit. Establishing the interference fit between the laminated sheet package and the housing requires tight tolerances and a complex joining process.

It is an object of the present invention to provide efficient and readily implementable cooling for a stator of an electric machine of a motor vehicle.

This object is achieved according to the invention by a cooling device, a stator, as well as a motor vehicle having the features according to the respective independent patent claims. Advantageous embodiments of the invention are the subject matter of the dependent patent claims, of the description, as well as of the figures.

A cooling device according to the invention for cooling a stator for an electric machine of a motor vehicle has a coolant directing unit and at least one winding groove cooling duct, wherein the coolant directing unit and the at least one winding groove cooling duct are configured as a functional unit. The coolant directing unit and the at least one winding groove cooling duct are configured so as to be plug-fittable to a hollow-cylindrical laminated sheet package of the stator which in a revolving direction has a multiplicity of axially extending winding grooves that are configured for receiving windings. The coolant directing unit is configured for disposal on an end side of the laminated sheet package and for directing coolant along the end side and has an infeed for feeding the coolant, and an outfeed for discharging the coolant. The at least one winding groove cooling duct that, proceeding from the coolant directing unit, extends axially is configured for disposal in at least one winding groove and for directing the coolant in the at least one winding groove, and is fluidically coupled to the infeed and the outfeed.

The invention moreover relates to a stator for an electric machine of a motor vehicle, having a hollow-cylindrical laminated sheet package which in a revolving direction has a multiplicity of axially extending winding grooves having windings which are disposed in the winding grooves, and having a cooling device according to the invention, wherein the cooling device is plug-fitted to the laminated sheet package. The at least one winding groove cooling duct conjointly with windings of the stator is disposed in at least one winding groove of the laminated sheet package, and the coolant directing unit is disposed on the end side of the laminated sheet package.

The electric machine is in particular a propulsion machine for a motor vehicle in the form of an electric or hybrid vehicle. The electric machine has the stator which comprises the hollow-cylindrical laminated sheet package as well as electrical windings. A rotor can be rotatably mounted within the cylindrical internal region formed by the hollow-cylindrical laminated sheet package, wherein a rotation axis of the rotor corresponds to a longitudinal axis of the hollow-cylindrical laminated sheet package. In the radial direction, thus in a manner perpendicular to the rotation axis, the rotor is enclosed, or surrounded, respectively, by the stator, while configuring an air gap. The laminated sheet package on an internal side that faces the air gap herein has the winding grooves for receiving the windings. The winding grooves in the revolving direction are in particular radially disposed and are mutually equidistant, and in the axial direction extend from a first end side of the laminated sheet package up to a second end side of the laminated sheet package that is opposite the first end side. In the axial direction, thus along the rotation axis, the windings disposed in the winding grooves can protrude beyond the laminated sheet package at the end sides, and there configure a respective crown-shaped, or annular, respectively, coil head. The windings of the stator can be configured, for example, as shaped-bar windings or round-wire windings.

In order for the stator to be cooled, the cooling device can be plug-fitted to the laminated sheet package. In particular, the cooling device for plug-fitting to the laminated sheet package is plugged into, or pushed into, respectively, the laminated sheet package in regions. The cooling device herein is in particular prefabricated, or preassembled, respectively, in order for the functional unit to be configured. This means that the coolant directing unit and the at least one winding groove cooling duct are already joined to one another prior to being plug-fitted to the laminated sheet package such that the plug-fitting-ready functional unit, or the plug-fitting unit, respectively, that is in particular sealed in relation to an environment results. The cooling device as an entity can thus be plug-fitted into the laminated sheet package and also be released again from the laminated sheet package in a non-destructive manner. The cooling device and the laminated sheet package can in particular be plug-fitted to an exact fit, and thus configure a plug-fitting system, or a kit system, respectively. The cooling device herein can be configured so as to be in one part, or integral, respectively. It can also be provided that the cooling device is configured in multiple parts, wherein the coolant unit and the at least one winding groove cooling duct are joined and connected in order for the functional unit to be configured, wherein joints, or contact locations, respectively, are sealed, for example, by means of adhesive bonding, press-fitting, sealing members, or the like. The coolant directing unit and the at least one winding groove cooling duct are preferably configured as injection-molded parts. The coolant unit and the at least one winding groove cooling duct can be made from a suitable plastics material, for example by means of an injection-molding method.

The coolant directing unit is in particular configured in such a manner that the coolant directing unit in the plug-fitted state of the cooling device to the laminated sheet package at least in regions overlaps with the end side of the laminated sheet package. The coolant directing unit has the infeed by way of which the coolant, or the cooling medium, respectively, for example water, can be fed to the cooling device. Moreover, the coolant unit has the outfeed by way of which the coolant can be discharged again from the cooling device. The infeed and the outfeed herein in the plug-fitted state are disposed on the same end side, or the same axial end, respectively, of the laminated sheet package. The coolant is thus directed through the coolant directing unit along the end side of the laminated sheet package in particular in a plane defined by the radial direction and the revolving direction. The coolant directing unit which is situated in the region of the coil head of the stator can also be cast, or embedded in a casting compound, respectively, conjointly with the coil head, such that the coil head can be additionally cooled by way of the coolant directing unit.

The at least one winding groove cooling duct herein, proceeding from the coolant unit, extends in the axial direction and in the plug-fitted state of the cooling device to the laminated sheet package is disposed conjointly with windings of the stator within at least one winding groove. For example, the cooling device can have a number of winding groove cooling ducts corresponding to the number of winding grooves. The at least one winding groove cooling duct can extend across an entire height of the laminated sheet package, from the first end side on which the coolant unit is disposed, for example, up to a second end side of the laminated sheet package that is opposite the first end side. However, it can also be provided that the at least one winding groove cooling duct extends only in regions in the at least one winding groove, or at the second end side protrudes beyond the at least one winding groove.

The at least one winding groove cooling duct is conceived for directing the coolant from the infeed of the coolant directing unit axially along a first flow direction from the first end side toward the second end side of the laminated sheet package, and for directing along a second flow direction counter to the first flow direction back toward the outfeed. The winding groove cooling duct herein directs the coolant along those windings which are disposed conjointly with the winding groove cooling duct in the respective winding groove. The at least one winding groove cooling duct herein is configured so as to be completely encased along the axial direction. The winding groove cooling duct can be configured, for example, as an in particular rectangular tube. The coolant does, i.e. not, touch the at least winding groove as well as the windings of the winding groove in which the at least one winding groove cooling duct is disposed, but is guided completely within the at least one winding groove cooling duct.

On account of the cooling device being configured as a sealed functional unit, said cooling device can be assembled on the stator in a particularly simple manner by plug-fitting to the laminated sheet package. The stator can be cooled in a reliable and efficient manner by directing cooling medium in the winding grooves of the laminated sheet package. The heat thus does not have to be dissipated in a complex manner to a cooled housing. The stator can thus be configured so as to be without a housing, for example.

The coolant directing unit particularly preferably has an annular cover element for disposal on the end side of the laminated sheet package, wherein the infeed has at least one infeed port and an annular infeed duct, and the outfeed has at least one outfeed port and an annular outfeed duct, and wherein the infeed duct and the outfeed duct are fluidically separated by a separation wall of the coolant directing unit. The annular cover element has an internal wall lying inward in the radial direction, and an external wall lying outward in the radial direction, for example. The internal wall and the external wall are thus disposed so as to be mutually concentric. The cover element can moreover have an annular base which in the assembled state of the cooling device to the laminated sheet package faces the end side of the laminated sheet package, and an annular cover that is axially opposite the base. The infeed duct and the outfeed duct herein are in particular disposed on one another so as to be mutually concentric, and are separated by the, for example annular, separation wall that is disposed between the internal wall and the external wall. For example, the infeed duct can be formed by the internal wall, the separation wall, the base, and the cover. The outfeed duct can be formed by the separation wall, the external wall, the base, and the cover. The infeed duct and the outfeed duct are fluidically coupled to the at least one winding groove cooling duct. The infeed duct is configured for injecting the coolant into the at least one winding groove cooling duct. The outfeed duct is configured for discharging the coolant from the at least one winding groove cooling duct.

The at least one infeed port by way of which the coolant is capable of being guided into the infeed duct, and the at least one outfeed port by way of which the coolant is capable of being retrieved from the outfeed duct, are in particular disposed in the cover of the cover element. The infeed port is fluidically coupled to the infeed duct; the outfeed port is fluidically coupled to the outfeed duct. Openings can be disposed in the base, for example, the winding groove cooling ducts being disposed so as to be adjacent to said openings and by way of which the coolant can be directed into, or out of, the corresponding winding groove cooling duct. The winding groove cooling ducts in the revolving direction can be disposed so as to completely encircle the annular cover element such that the winding groove cooling ducts configure a cylindrical cage structure.

It proves advantageous for the at least one winding groove cooling duct to have an axially extending inflow duct region which, for directing the coolant in a winding groove, is fluidically coupled to the infeed, and an axially extending return flow duct region which, for directing the coolant out of a winding groove, is fluidically coupled to the outfeed, wherein the inflow duct region and the return flow duct region are fluidically coupled by way of a deflection element. Each winding groove cooling duct thus has the two duct regions which extend in the axial direction and in particular so as to be mutually parallel. The inflow duct regions directs the coolant from the infeed of the coolant directing unit in the first flow direction axially through that winding groove in which the inflow duct region in the plug-fitted state of the cooling device to the laminated sheet package is disposed. The return flow duct region directs the coolant in the second flow direction axially through that winding groove in which the return flow duct region in the plug-fitted state of the cooling device to the laminated sheet package is disposed. In order for the flow direction of the coolant to be changed, or the coolant to be directed from the inflow duct region into the return flow duct region, respectively, the deflection element is fluidically coupled to the duct regions. The deflection element can be configured, for example, so as to be U-shaped and be disposed so as to be adjacent to axial ends of the duct regions.

According to a first embodiment of the invention, the inflow duct region and the return flow duct region of the at least one winding groove cooling duct are capable of being conjointly disposed in a winding groove of the laminated sheet package such that the winding groove cooling duct is configured for directing the cooling medium in the same winding groove from the infeed back to the outfeed. In other words, the inflow duct region and the return flow duct region of the at least one winding groove cooling duct are configured, or mutually disposed, respectively, in such a manner that said inflow duct region and said return flow duct region can be conjointly disposed in a winding groove of the laminated sheet package. The return flow duct region and the inflow duct region in the plug-fitted state of the cooling device to the laminated sheet package are thus conjointly disposed in a winding groove of the laminated sheet package. The cooling medium is thus directed back and forth in the same winding groove, thus directed from the infeed of the coolant directing unit back into the outfeed of the coolant directing unit. The cooling device in this case has in particular a number of winding groove cooling ducts corresponding to the number of winding grooves, thus in each case a number of return flow duct regions and inflow duct regions corresponding to the number of winding grooves. In particular, one winding groove cooling duct is thus provided for each winding groove. In particular, duct regions of a winding groove cooling duct are disposed behind one another in the radial direction in the associated winding groove. For example, one of the duct regions, for example the inflow duct region, is disposed so as to be inward in the radial direction, thus in a region of the winding groove that faces the air gap. The other duct region, for example the return flow duct region, can be disposed between the inflow duct region and the rear wall of the winding groove, in a region of the winding groove that faces a rear wall of the winding groove. The rear wall of the winding groove in the radial direction forms the transition between the winding groove and the laminated sheet package. On account of the inflow duct region as well as the return flow duct region being disposed in one winding groove, the laminated sheet package and thus the stator can be efficiently cooled.

It can be provided herein that the inflow duct region and the return flow duct region are configured so as to be mutually adjacent. For example, each winding groove cooling duct can be configured in one part and comprise the inflow duct region, the return flow duct region, as well as the deflection element. To this end, the winding groove cooling duct can be configured, for example, as a rectangular tube in which, proceeding from the coolant unit, a separation wall extends in the axial direction, however not across the entire length of the winding groove cooling duct. A gap formed on account thereof between the inflow duct region and the return flow duct region thus forms the deflection element. The winding groove cooling duct herein can be disposed, for example, in the radially inward region of the winding groove that faces the air gap. The winding groove of the laminated sheet package in a region of the winding groove which in the radial direction lies behind the region having the winding groove cooling duct can be filled with windings. The winding groove cooling duct can also be disposed so as to be adjacent to the rear wall of the winding groove. The windings can be disposed in a region of the winding groove that faces the air gap and in the radial direction lies ahead of the winding groove cooling duct. Alternatively or additionally, the winding groove cooling duct can be disposed in a region between the region that faces the rear wall of the winding groove and the region that faces the air gap. In this instance, the windings in the radial direction can be disposed ahead of and behind the winding groove cooling duct. The windings are thus separated, or mutually separated, respectively, by the winding groove cooling duct.

It can also be provided that the inflow duct region and the return flow duct region while configuring an intermediate region are configured so as to be radially mutually spaced apart, wherein windings of the stator in the intermediate region are capable of being disposed in the winding groove. For example, the inflow duct region can be disposed in the region of the winding groove that faces the air gap. Windings can be disposed so as to be adjacent to the inflow duct region, and the return flow duct region can be disposed in the region of the winding groove that faces the rear wall of the winding groove, so as to be adjacent to the windings. The windings in the radial direction are thus surrounded by the duct regions on both sides such that the stator can be cooled in a particularly reliable manner by directing the coolant on both sides along the windings.

The deflection element between the inflow duct region and the radially spaced-apart return flow duct region is preferably configured so as to project in the revolving direction from the inflow duct region and the return flow duct region, and is capable of being disposed so as to overlap with a stator tooth that is adjacent to the at least one winding groove. The inflow duct region and the return flow duct region in the plug-fitted state of the cooling device to the laminated sheet package here extend in particular across the entire height of the laminated sheet package from the first end side on which the coolant directing unit is disposed, up to the second end side. The winding groove cooling duct can be configured, for example, in one part as a tube bent in a U-shaped manner.

The deflection element which is configured, for example, by the bent region of the winding groove cooling duct, is in particular disposed on the second end side of the laminated sheet package and overlaps with the stator tooth that is situated on the second end side. A stator tooth herein is configured by a region of the laminated sheet package between two neighboring winding grooves in the revolving direction. For example, the deflection element of the winding groove cooling duct that projects on the second end side after the plug-fitting of the cooling device to the laminated sheet package can be bent, or folded back, respectively in the direction of the stator tooth. This embodiment is based on the concept that the coil heads protrude from the winding grooves beyond the second end side. The deflection element is advantageously disposed in a particularly space-saving manner between the coil heads. This moreover results in the advantage that the coil heads where particularly hot locations, so-called "hot spots", can form, are also able to be reliably cooled.

According to a second embodiment of the invention, the inflow duct region and the return flow duct region of the at least one winding groove cooling duct are disposed so as to be mutually spaced apart in the revolving direction, wherein the inflow duct region is capable of being disposed in a first winding groove and the return flow duct region is capable of being disposed in a second winding groove that neighbors the first winding groove. According to this embodiment, in the plug-fitted state of the cooling device to the laminated sheet package, inflow duct regions and return flow duct regions can be disposed in an alternating manner thus in the revolving direction in the winding grooves, wherein an inflow duct region of a first winding groove and a return flow duct region of a second winding groove adjacent thereto configure one winding groove cooling duct. The cooling device thus has in particular half as many winding groove cooling ducts as winding grooves. The cooling medium here is directed from the infeed of the coolant directing unit into the inflow duct region of the first winding groove, and by way of the return flow duct region of the second winding groove directed back to the outfeed of the coolant directing unit. The disposal of only one duct region in one winding groove results in the advantage that the individual duct regions can be configured with a larger diameter, on account of which a larger cross section results for the cooling medium flowing through the duct region.

It can be provided herein that the cooling device has a deflection installation having the at least one deflection element, wherein the deflection installation is configured for disposal on an end side of the laminated sheet package that is opposite the end side of the laminated sheet package having the coolant directing unit and is configured so as to be plug-fittable to the at least one winding groove cooling duct. The deflection installation can be configured, for example, as an annular cover element which can be disposed on the second end side of the laminated sheet package. For example, the functional unit having the coolant directing unit and the at least one winding groove cooling duct can firstly be plug-fitted into the laminated sheet package from a first direction such that the duct regions are pushed into the respective winding grooves and the coolant directing unit is disposed on the first end side of the laminated sheet package. The deflection installation can then be placed onto the second end side from a second direction counter to the first direction such that two neighboring duct regions are fluidically coupled by way of a deflection element of the deflection installation. The deflection installation herein has in particular a number of deflection elements corresponding to the number of winding groove cooling ducts.

In the case of a stator according to the invention which has the cooling device according to the invention it is preferably provided that a region of the winding groove in which the at least one winding groove cooling duct is disposed in the revolving direction is widened in comparison to a region in which windings of the stator are disposed. For example, the winding grooves can be widened in such a manner that said winding grooves have parallel winding groove flanks in that region in which the winding groove cooling duct is disposed. The winding groove flanks form a transition in the revolving direction between a winding groove and the laminated sheet package. A winding groove is thus in particular formed by two mutually opposite winding groove flanks and the rear wall. The region of the winding grooves can also be widened in such a manner that the stator tooth that is adjacent to the region of the winding grooves is configured so as to have parallel flanks. It can furthermore be provided that the winding groove for receiving the at least one winding groove cooling duct in the radial direction is configured so as to be elongated in relation to a winding groove of a conventional stator known according to the prior art. Depending on the disposal of the at least one winding groove cooling duct in the at least one winding groove, the windings can then be displaced within the winding grooves.

A motor vehicle according to the invention comprises an electric machine having a stator according to the invention. The motor vehicle is in particular configured as an electric vehicle or a hybrid vehicle which comprises the electric machine for propelling the motor vehicle.

The embodiments proposed with reference to the cooling device according to the invention, and the advantages of said embodiments apply in an analogous manner to the stator according to the invention as well as to the motor vehicle according to the invention.

Further features of the invention are derived from the claims, the figures, and the description of the figures. The features and combinations of features stated above in the description and also the features and combinations of features stated below in the description of the figures and/or shown in the figures alone can be used not only in the combination specified in each case but also in other combinations or in isolation.

The invention will now be explained in more detail by means of a preferred exemplary embodiment as well as with reference to the drawings in which:

Other objects, advantages and novel features of the present invention will become apparent from the following detailed description of one or more preferred embodiments when considered in conjunction with the accompanying drawings.

BRIEF DESCRIPTION OF THE DRAWINGS

Identical elements as well as functionally equivalent elements are provided with the same reference signs in the figures.

DETAILED DESCRIPTION OF THE DRAWINGS

Figure 1:
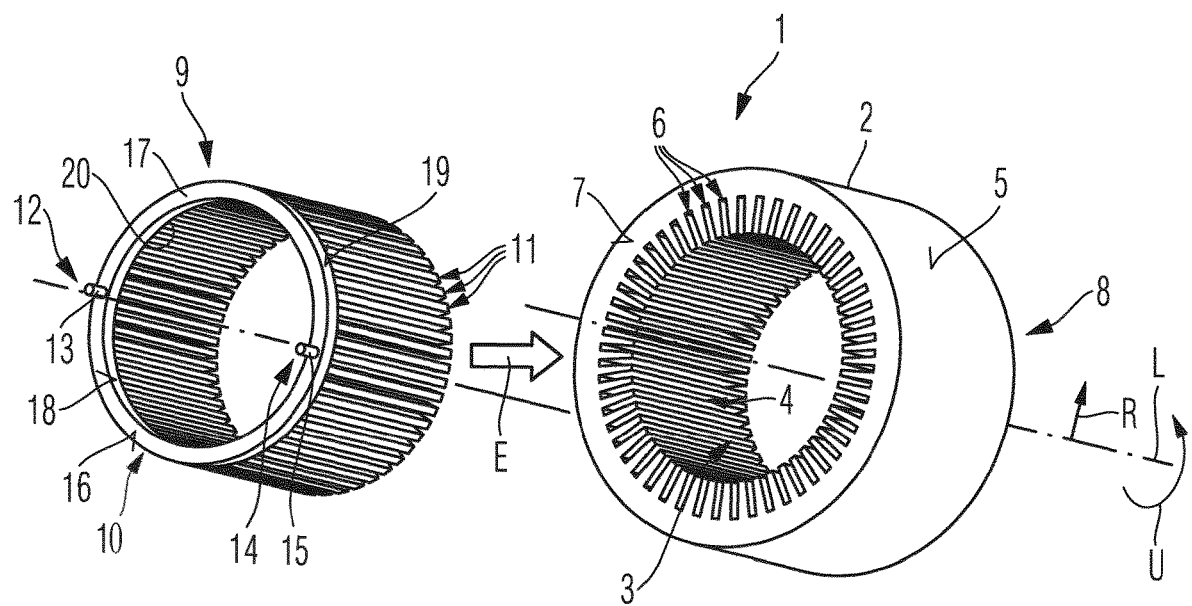
FIG. 1 shows a schematic exploded illustration of an embodiment of the stator according to the invention having an embodiment of the cooling device according to the invention.
Figure 2:
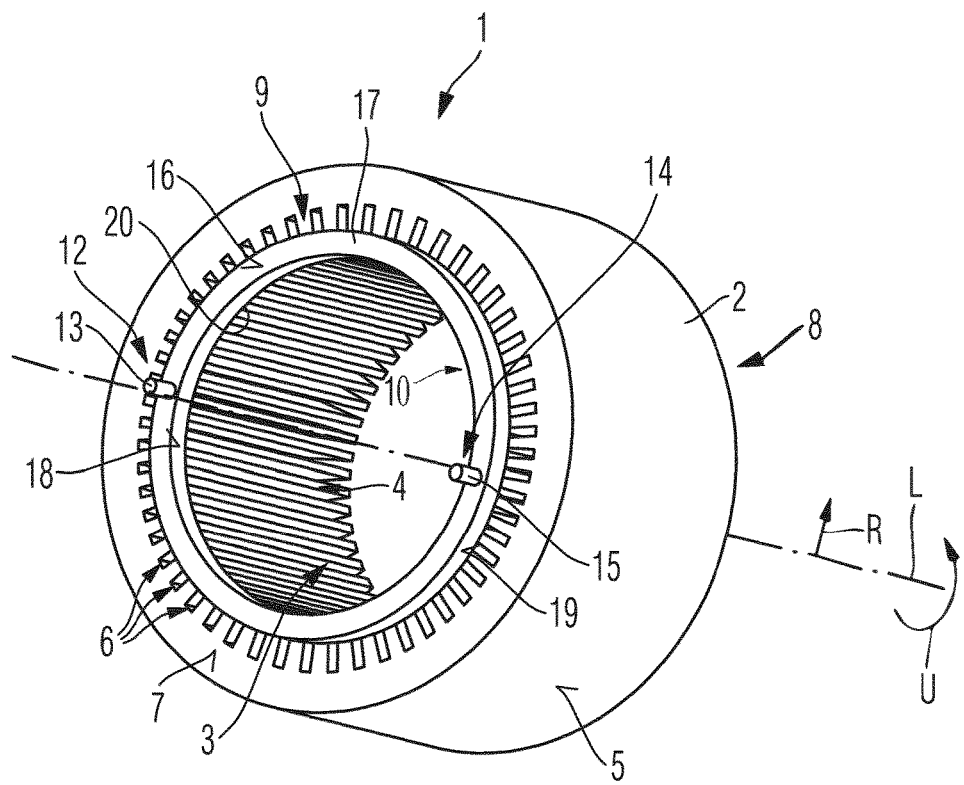
FIG. 2 shows the stator according to FIG. 1 in the joined state.

FIG. 1 and FIG. 2 show components of a stator 1 for an electric machine (not shown here) of a motor vehicle. The electric machine can be, for example, an electric propulsion motor for a motor vehicle configured as an electric vehicle or hybrid vehicle. The stator 1 has a hollow-cylindrical laminated sheet package 2 that along a revolving direction U runs about a longitudinal axis L of the stator 1. The longitudinal axis L also corresponds to a rotation axis about which a rotor (not shown here) that is mounted within the stator 1 rotates. The laminated sheet package 2 has an internal side 4 which is configured so as to be adjacent to an air gap 3 between the rotor and the stator 2. Moreover, the laminated sheet package 2 has an external side 5 that in the radial direction R lies opposite the internal side 4. Moreover, a multiplicity of winding grooves 6 which in the revolving direction U are radially disposed are configured in the internal side 4 of the laminated sheet package 2. The winding grooves 6 along the longitudinal axis L extend axially from a first end side 7 of the laminated sheet package 2 to a second end side 8 of the laminated sheet package 2 that is axially opposite the first end side 7. Windings (not shown here) of the stator 1 are disposed in the winding grooves 6. The windings form respective coil heads at the end sides 7, 8.

Moreover, the stator 1 has a cooling device 9 of which a first embodiment is shown in FIG. 1 and FIG. 2. The cooling device 9 herein has a coolant directing unit 10 which is a coolant directing structure, as well as at least one winding groove cooling duct 11, here a multiplicity of axially extending winding groove cooling ducts 11. The coolant directing unit 10 and the winding groove cooling ducts 11 configure a functional unit. On account thereof, the cooling device 9 as an entity can at least in regions be introduced, or plug-fitted, respectively, into the laminated sheet package 2 along an introduction direction E (see exploded illustration of the stator 1 according to FIG. 1). The cooling device 9 and the laminated sheet package 2 can thus be plug-fitted to one another. The cooling device 9 as well as the laminated sheet package 2 are shown in the plug-fitted state in FIG. 2. In the plug-fitted state of the cooling device 9 and the laminated sheet package 2, one winding groove cooling duct 11 is in each case disposed in one winding groove 6. A number of winding groove cooling ducts 11 thus corresponds to a number of winding grooves 6. The coolant directing unit 10 in the plug-fitted state of the cooling device 9 and the laminated sheet package 2 is disposed on the first end side 7 of the laminated sheet package 2 and at least in portions overlaps with the first end side 7.

The coolant directing unit 10 here has an infeed 12 having at least one infeed port 13 for feeding coolant, and an outfeed 14 having at least one outfeed port 15 for discharging coolant. The infeed port 13 and the outfeed port 15 here are disposed in an annular cover 16 of an annular cover element 17 of the coolant directing unit 10. An internal space of the cover element 17 which can comprise an annular infeed duct that is fluidically connected to the infeed port 13 as well as an annular outfeed duct that is fluidically connected to the outfeed port 15 is enclosed by the cover 16, an annular internal wall 18, an annular external wall 19, and a base 20 of the cover element 17. The infeed duct and the outfeed duct are in particular separated by a separation wall and are disposed so as to be mutually concentric, thus mutually adjacent in the radial direction R. The winding groove cooling ducts 11 herein are fluidically coupled to the infeed duct and the outfeed duct. To this end, openings by way of which coolant from the infeed duct can be directed into the respective winding groove cooling duct 11, or from the respective winding groove cooling duct 11 into the outfeed duct, can be provided in the base 20. The winding groove cooling ducts 11 for cooling the stator 1 can thus direct the coolant through the winding grooves 6 and along the windings disposed in the winding grooves 6.

Various design embodiments of the cooling device 9 according to FIG. 1 and FIG. 2 are shown in FIG. 3A to FIG. 3D. To this end, a cross section through the laminated sheet package 2 is in each case shown on the left side in FIG. 3A to FIG. 3D, and an enlarged illustration of a fragment of the cross section having three neighboring winding grooves 6 is shown in each case on the right side. According to FIGS. 3A to 3D, one winding groove cooling duct 11 which has an inflow duct region 21 as well as a return flow duct region 22 is in each case disposed in one winding groove 6. The inflow duct region 21 herein is fluidically coupled to the infeed 12, and the return flow duct region 22 is fluidically coupled to the outfeed 14. Moreover, the inflow duct region 21 and the return flow duct region 22 are fluidically coupled by way of a deflection element (not shown here). The deflection element can be situated, for example, on the second end side 8 of the laminated sheet package 2. The coolant is thus directed from the coolant directing unit 10 through the inflow duct region 21 in a winding groove 6, and by way of the return flow duct region 22 in the same winding groove 6 directed back to the coolant directing unit 10.

The inflow duct region 21 as well as the return flow duct region 22 here are disposed behind one another in the radial direction R. According to the design embodiments of the cooling device 9 according to FIGS. 3A, 3B, 3C, the inflow duct region 21 and the return flow duct region 22 are configured so as to be mutually adjacent. To this end, the winding groove cooling duct 11 can have, for example, an axially running separation wall 23 by way of which an internal space of the winding groove cooling duct 11 is divided into two sub-spaces that run in parallel and configure the duct regions 21, 22. According to FIG. 3d, the inflow duct region 21 and the return flow duct region 22 are configured so as to be mutually spaced apart in the radial direction R.

Figure 3A:
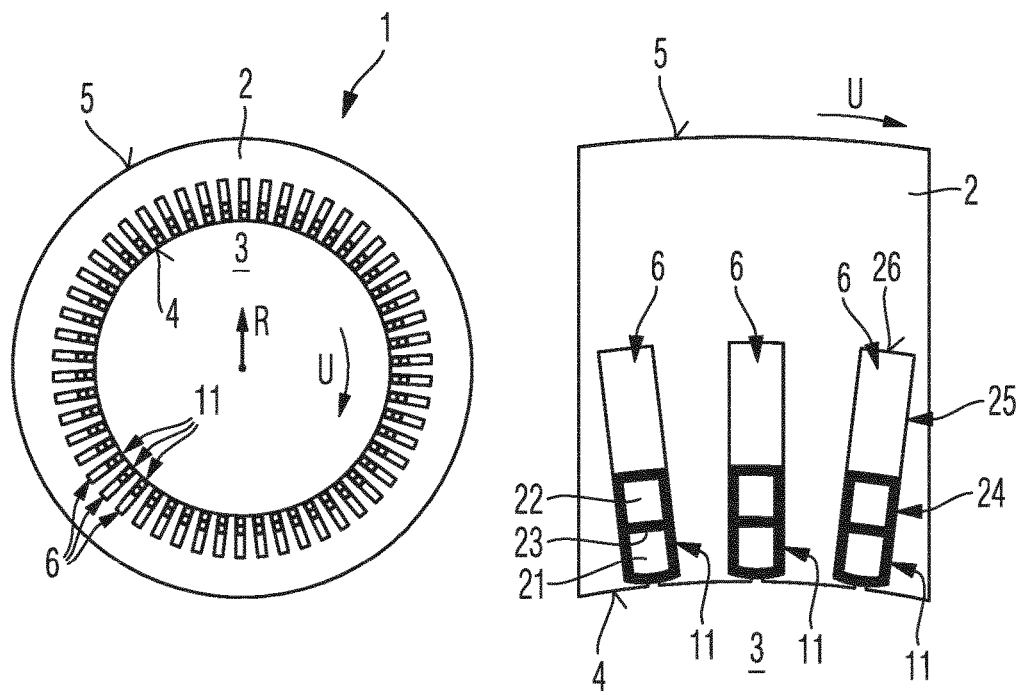
FIGS. 3A to 3D show a plan view of the stator having a first design embodiment of the embodiment of the cooling device according to FIG. 1 and FIG. 2.
Figure 3B:
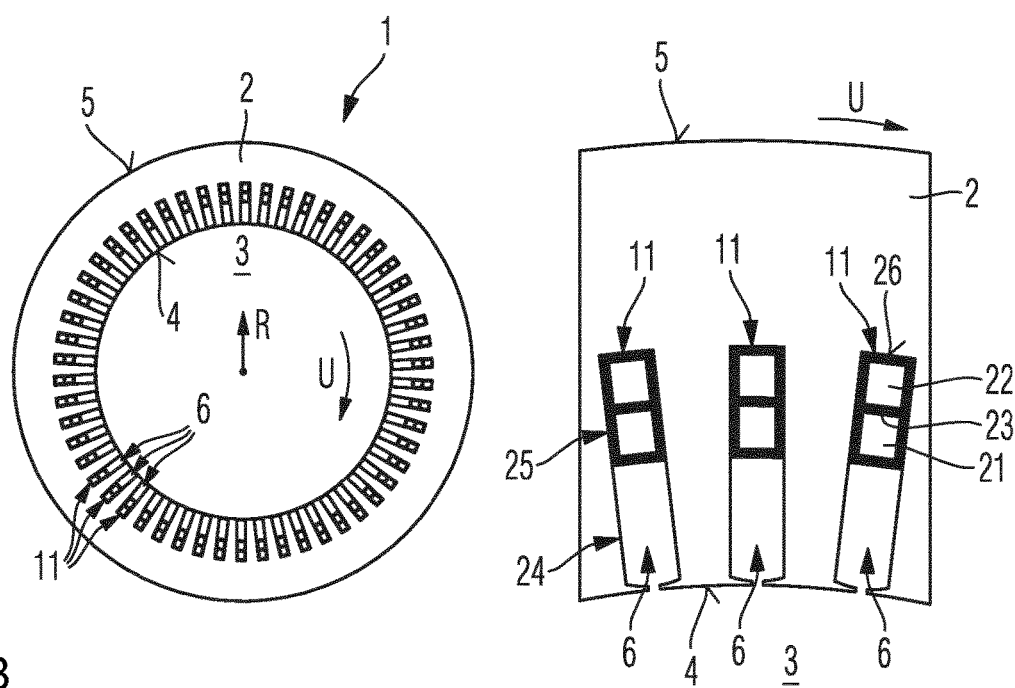
Figure 3C:
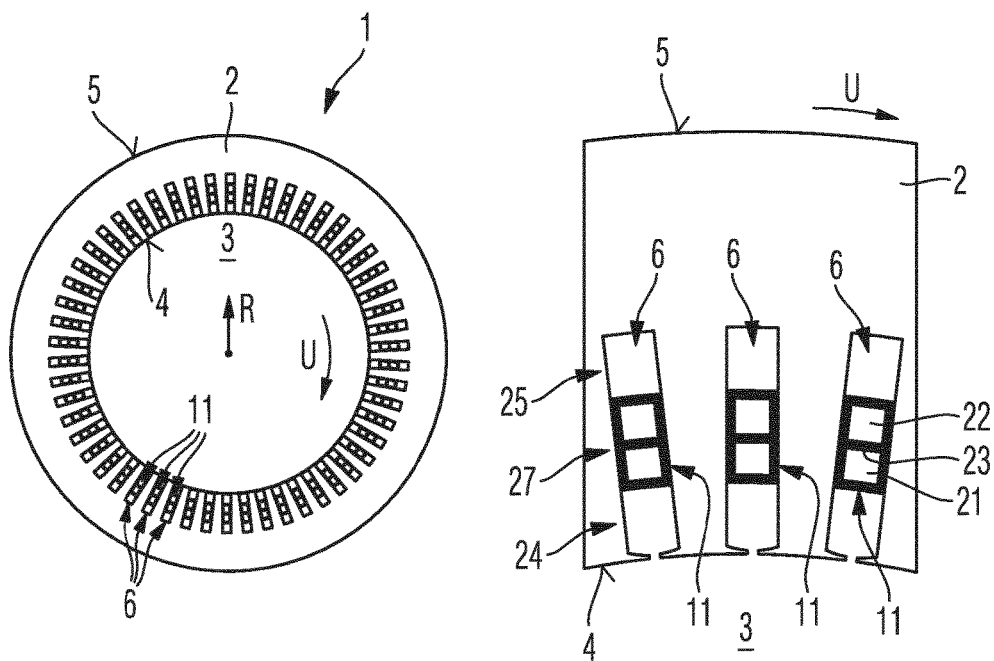
Figure 3D:
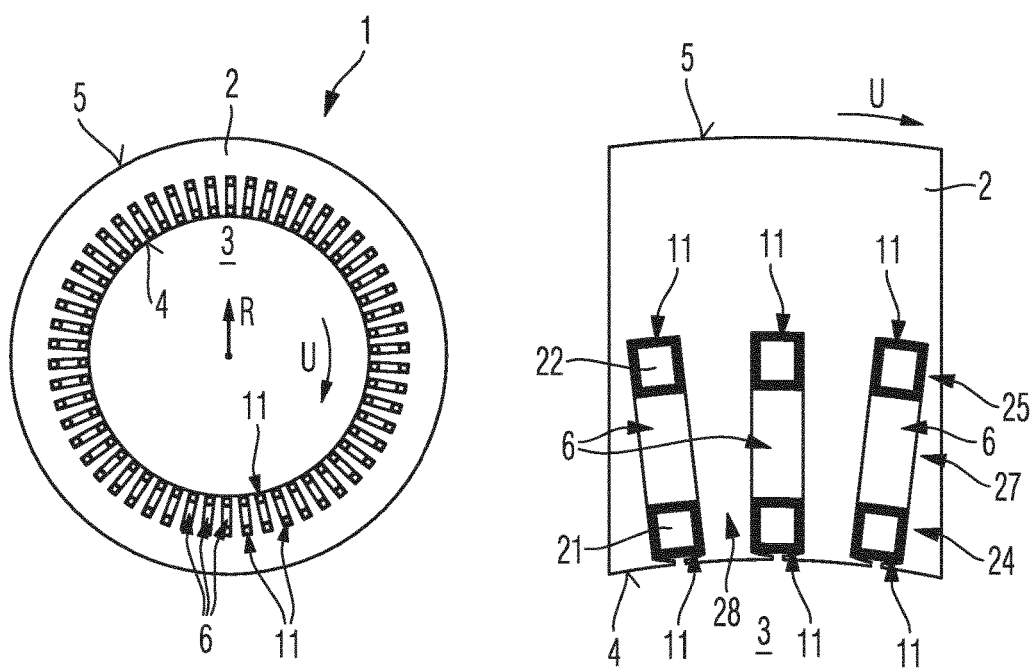

According to FIG. 3A, the winding groove cooling ducts 11 are in each case disposed in a first region 24 of the winding grooves 6 that is adjacent to the air gap 3. The windings of the stator 1 can be disposed in a second region 25 which here is adjacent to the first region 24 and on the rear side is adjacent to a rear wall 26 of the winding groove 6. The windings in the radial direction R are thus disposed behind the winding groove cooling ducts 11. According to FIG. 3B, the winding groove cooling ducts 11 are disposed in the second region 25, wherein the windings are disposed in the first region 24 of the winding grooves 6 that is adjacent to the air gap 3. The windings in the radial direction R are thus disposed ahead of the winding groove cooling ducts 11. According to FIG. 3C, the winding groove cooling ducts 11 are disposed so as to be centric in the winding grooves 6, in a third region 27 that lies between the first region 24 and the second region 25. The windings are then disposed in the first and the second region 24, 25. The windings in the radial direction R are thus disposed ahead of and behind the winding groove cooling ducts 11 and are separated by the winding groove cooling ducts 11. In FIG. 3D, one of the duct regions, here the inflow duct region 21, is disposed in the first region 24 of the winding groove 6, and the other duct region, here the return flow duct region 22, is disposed in the second region 25 of the winding groove 6. The windings are disposed in the third region 27, between the inflow duct region 21 and the return flow duct region 22. According to FIG. 3D, the deflection element can be bent back at the second end side 8 of the laminated sheet package 2, and run across a stator tooth 28 that neighbors the respective winding groove 6, for example.

Figure 4:
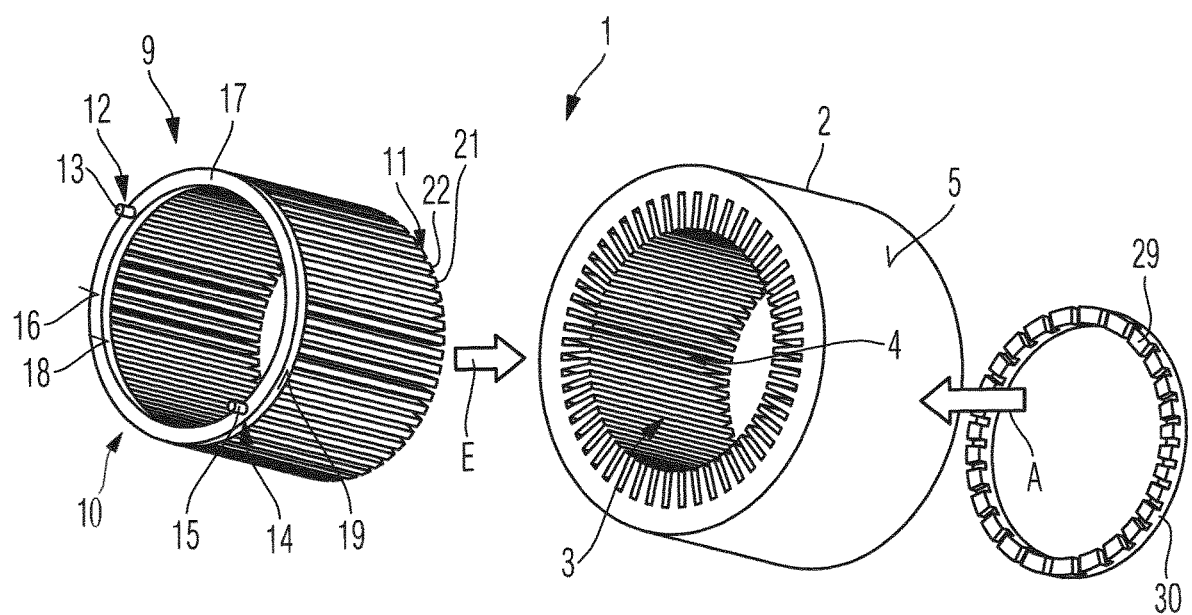
FIG. 4 shows a schematic exploded illustration of a further embodiment of the stator according to the invention having a further embodiment of the cooling device according to the invention.
Figure 5:
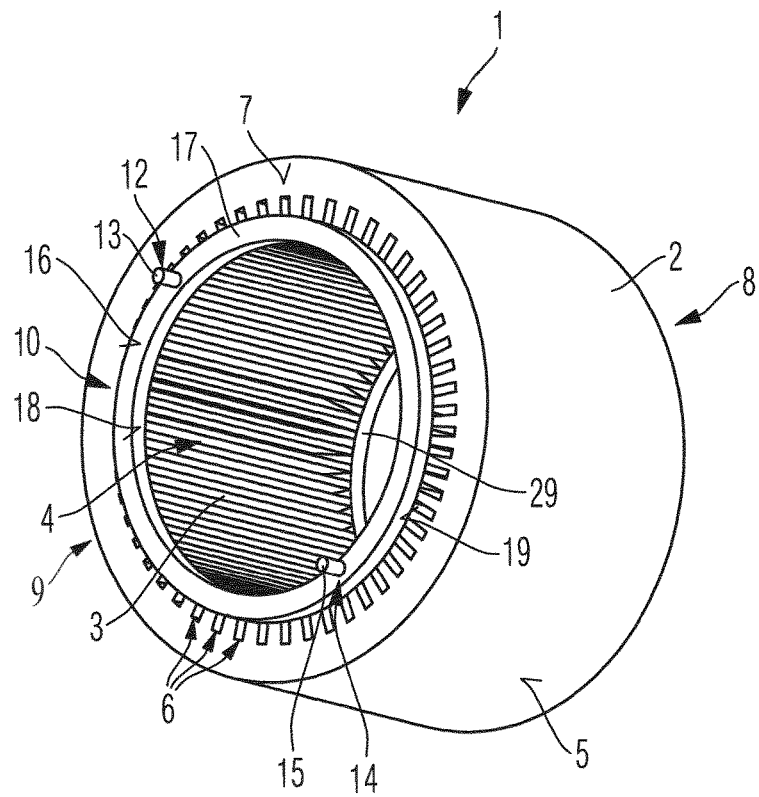
FIG. 5 shows the stator according to FIG. 4 in the joined state.

FIG. 4 and FIG. 5 show the laminated sheet package 2 as well as a second embodiment of a cooling device 9 of the stator 1. In the case of the cooling device 9 according to FIG. 4 and FIG. 5, a winding groove cooling duct 11 is formed by an inflow duct region 21 and a neighboring return flow duct region 22 which is disposed so as to be spaced apart from said inflow duct region 21 in the revolving direction U. The inflow duct region 21 of a winding groove cooling duct 11 herein is disposed in a winding groove 6, and the return flow duct region 22 of the same winding groove cooling duct 11 is disposed in a neighboring winding groove 6. One winding groove cooling duct 11 is thus divided between two neighboring winding grooves 6. A deflection installation 29 which has the deflection elements 30 is provided in order for the coolant to be deflected, or for the coolant to be directed, respectively, from the inflow duct region 21 in the one winding groove 6 into the return flow duct region 22 of the neighboring winding groove 6. The deflection installation 29 has one deflection element 30 for each winding groove cooling duct 11. The deflection installation 29 here is configured as an annular cover which in an attachment direction A counter to the introduction direction E is disposed on the second end side 8 of the laminated sheet package 2. The deflection installation 29 is plug-fitted to the functional unit and herein is coupled to the winding groove cooling ducts 11.

Figure 6A:
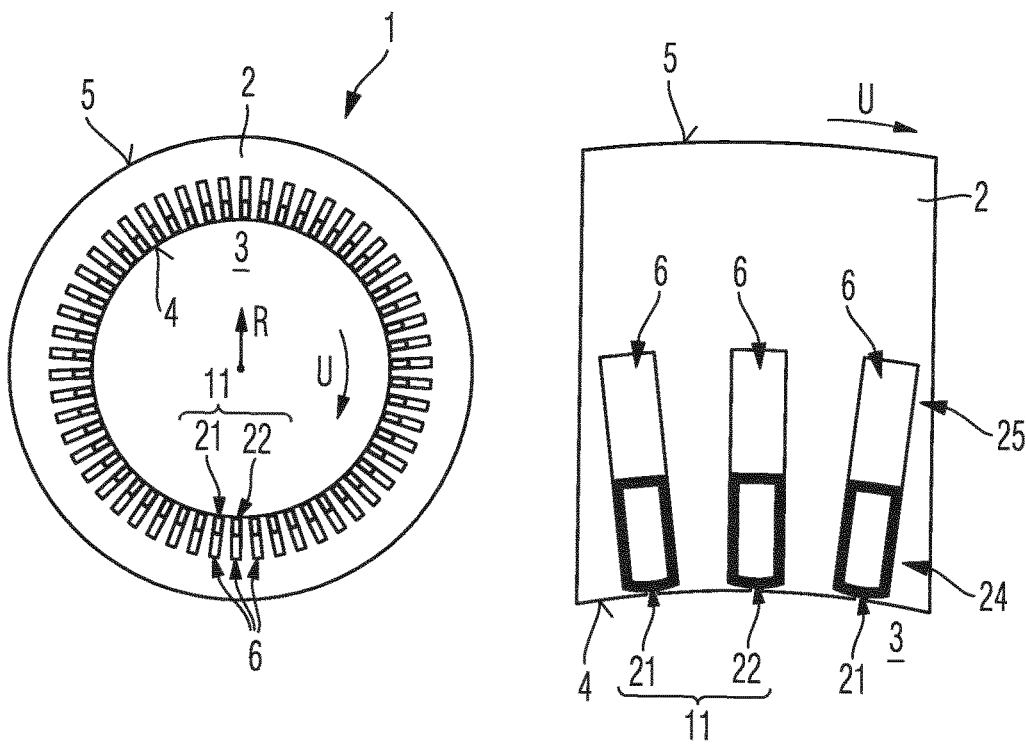
FIGS. 6A to 6C show a plan view of the stator having a first design embodiment of the embodiment of the cooling device according to FIG. 4 and FIG. 5.
Figure 6B:
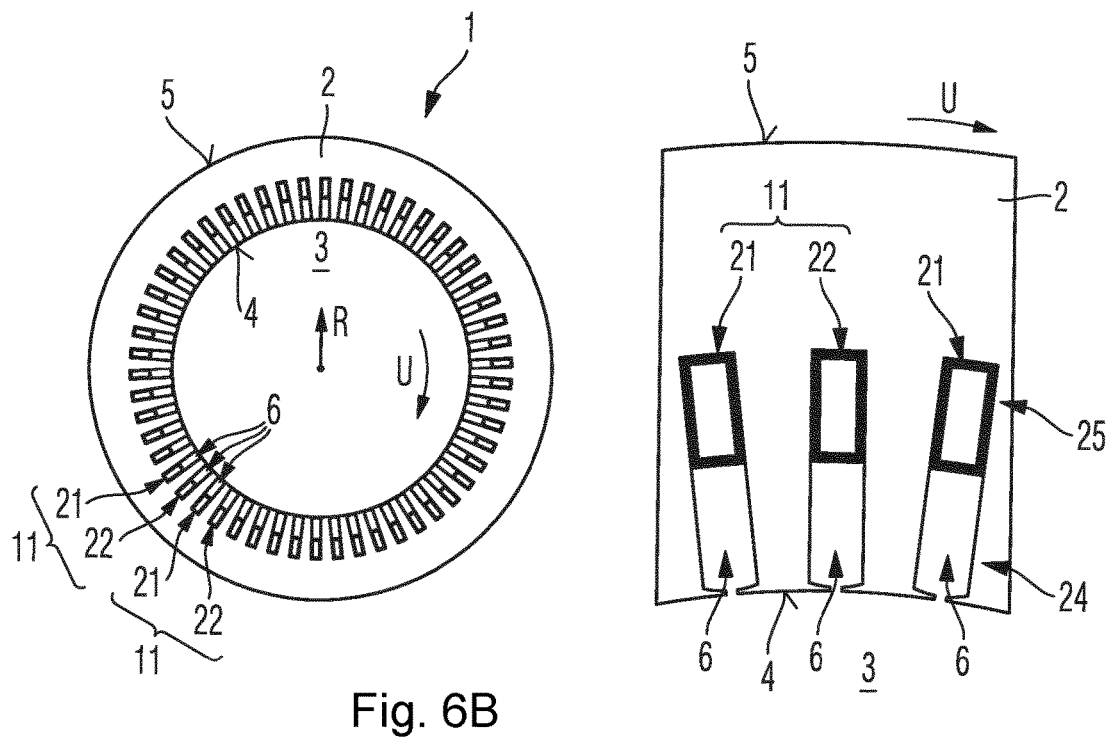
Figure 6C:
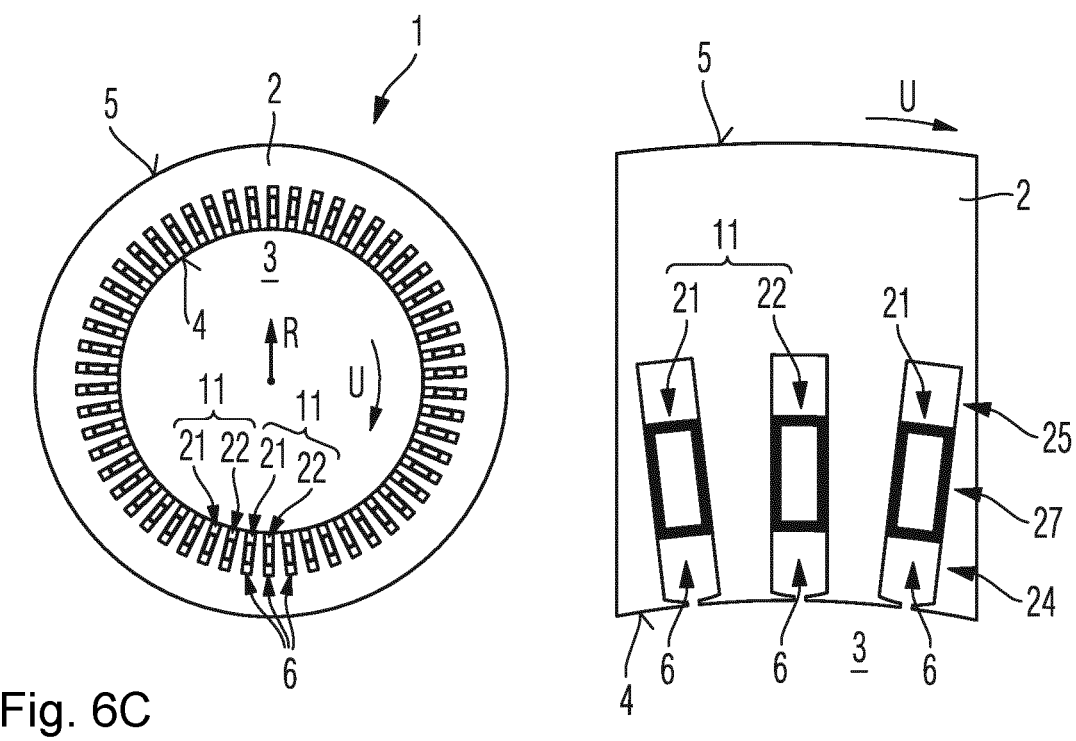

Various design embodiments of the cooling device 9 according to FIG. 4 and FIG. 5 are shown in FIG. 6A to FIG. 6C. To this end, a cross section through the laminated sheet package 2 is in each case shown on the left side in FIG. 6A to FIG. 6C, and an enlarged illustration of a fragment of the cross section having three neighboring winding grooves 6 is in each case shown on the right side. According to FIG. 6A, the inflow duct regions 21 and the return flow duct regions 22 that are disposed in an alternating manner in the winding grooves 6 are in each case disposed in the first region 24 of the winding grooves 6 that is adjacent to the air gap 3. The windings of the stator 1 can be disposed in the second region 25. The windings in the radial direction R are thus disposed behind the inflow duct regions 21, or the return flow duct regions 22, respectively. According to FIG. 6B, the inflow duct regions 21, or the return flow duct regions 22, respectively, are disposed in the second region 25, wherein the windings are disposed in the first region 24 that is adjacent to the air gap 3. The windings in the radial direction R are thus disposed ahead of the inflow duct regions 21, or the return flow duct regions 22, respectively. According to FIG. 6C, the inflow duct regions 21 and the return flow duct regions 22 are disposed so as to be centric in the winding grooves 6 in the third region 27 that lies between the first region 24 and the second region 25. The windings are then disposed in the first and the second region 24, 25. The windings in the radial direction R are thus disposed ahead of and behind the inflow duct regions 21 or the return flow duct regions 22, respectively, and are separated by the inflow duct regions 21, or the return flow duct regions 22, respectively.

It can be provided that the regions of the winding groove 6 in which the winding groove cooling ducts 11 are disposed are widened in relation to the regions of the winding groove 6 in which the windings are disposed. To this end, the regions having the winding groove cooling ducts 11 can be widened in such a manner, for example, that parallel groove flanks result. The regions having the winding groove cooling ducts 11 can also be widened in such a manner, for example, that parallel stator tooth flanks result. Moreover, it can be provided that the winding grooves 6 of the stator 1 in the radial direction R are elongated in relation to a conventional stator, only windings being disposed in the winding grooves thereof.

LIST OF REFERENCE SIGNS

1 Stator
2 Laminated sheet package
3 Air gap
4 Internal side
5 External side
6 Winding groove
7 First end side
8 Second end side
9 Cooling device
10 Coolant directing unit
11 Winding groove cooling duct
12 Infeed
13 Infeed port
14 Outfeed
15 Outfeed port
16 Cover
17 Cover element
18 Internal wall
19 External wall
20 Base
21 Inflow duct region
22 Return flow duct region
23 Separation wall
24 First region
25 Second region
26 Rear wall
27 Third region
28 Stator tooth
29 Deflection installation
30 Deflection element
L Longitudinal axis
U Revolving direction
R Radial direction
E Introduction direction
A Attachment direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling device for cooling a stator for an electric machine of a motor vehicle, the cooling device comprising:
   a coolant directing structure having an annular shape and including an end surface disposed at an axially outermost end of the cooling device, an annular internal wall facing radially inward, an annular external wall facing radially outward, and an open end opposite from the end surface; and
   at least one winding groove cooling duct disposed in contact with the open end of the coolant directing structure;
   wherein the coolant directing structure and the at least one winding groove cooling duct are configured as a functional unit and are plug-fitted to a hollow-cylindrical laminated sheet package of the stator which, in a revolving direction, has a multiplicity of axially extending winding grooves that are configured for receiving windings of the stator;

wherein the coolant directing structure is disposed on an end side of the laminated sheet package, directs coolant along the end side, and has an infeed for feeding the coolant and an outfeed for discharging the coolant;

wherein the at least one winding groove cooling duct, proceeding from the coolant directing structure, extends axially and is disposed in at least one winding groove and directs the coolant in the at least one winding groove, and is fluidically coupled to the infeed and the outfeed;

wherein the at least one winding groove cooling duct has an axially extending inflow duct region which, for directing the coolant in a winding groove, is fluidically coupled to the infeed, and an axially extending return flow duct region which, for directing the coolant out of a winding groove, is fluidically coupled to the outfeed, wherein the inflow duct region and the return flow duct region are fluidically coupled by way of a deflection element;

wherein the inflow duct region and the return flow duct region of the at least one winding groove cooling duct are disposed so as to be spaced apart from each other in the revolving direction, wherein the inflow duct region is capable of being disposed in a first winding groove and the return flow duct region is capable of being disposed in a second winding groove adjacent to the first winding groove;

wherein the cooling device has a deflection installation having the at least one deflection element, wherein the deflection installation is disposed on an opposite end of the cooling device from the coolant directing structure and is configured so as to be plug-fittable to the at least one winding groove cooling duct;

wherein the inflow duct region and the return flow duct region of the at least one winding groove cooling duct are capable of being conjointly disposed in a winding groove of the laminated sheet package such that the at least one winding groove cooling duct is configured for directing the coolant in the same winding groove from the infeed back to the outfeed;

wherein the inflow duct region and the return flow duct region, while configuring an intermediate region, are configured so as to be radially spaced apart from each other, wherein a winding of the stator in the intermediate region is disposed in the winding groove; and wherein the deflection element between the inflow duct region and the radially spaced-apart return flow duct region is configured so as to project in the revolving direction from the inflow duct region and the return flow duct region, and is capable of being disposed so as to overlap with a stator tooth that is adjacent to the at least one winding groove.

2. The cooling device according to claim 1, wherein the coolant directing structure and the at least one winding groove cooling duct are configured as injection-molded parts.

3. The cooling device according to claim 1, wherein the coolant directing structure has an annular cover element, including the end surface, disposed on the end side of the laminated sheet package, wherein the infeed has at least one infeed port and an annular infeed duct, and the outfeed has at least one outfeed port and an annular outfeed duct, and wherein the infeed duct and the outfeed duct are separated by a separation wall.

4. The cooling device according to claim 1, wherein the inflow duct region and the return flow duct region are configured so as to be adjacent to each other.

5. A stator for an electric machine of a motor vehicle, comprising:
a hollow-cylindrical laminated sheet package, which in a revolving direction has a multiplicity of axially extending winding grooves having windings which are disposed in the winding grooves; and
a cooling device according to claim 1, wherein the cooling device is plug-fitted to the laminated sheet package, the at least one winding groove cooling duct is disposed with windings of the stator in at least one winding groove of the laminated sheet package, and the coolant directing structure is disposed on the end side of the laminated sheet package.

6. The stator according to claim 5, wherein a region of the winding groove, in which the at least one winding groove cooling duct is disposed in the revolving direction, is configured so as to be widened in comparison to a region in which a winding of the stator is disposed.

7. A motor vehicle having an electric machine having a stator according to claim 5.

* * * * *